US008020197B2

(12) United States Patent
Shiran et al.

(10) Patent No.: US 8,020,197 B2
(45) Date of Patent: Sep. 13, 2011

(54) EXPLICIT DELEGATION WITH STRONG AUTHENTICATION

(75) Inventors: Tomer Shiran, Haifa (IL); Sara Bitan, Moshav Hadar-Am (IL); Nir Nice, Kefar Veradim (IL); Jeroen de Borst, Redmond, WA (US); Dave Field, Seattle, WA (US); Shai Herzog, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1017 days.

(21) Appl. No.: 11/276,139

(22) Filed: Feb. 15, 2006

(65) Prior Publication Data

US 2007/0192836 A1 Aug. 16, 2007

(51) Int. Cl.
*G06F 7/04* (2006.01)
*H04L 9/32* (2006.01)
(52) U.S. Cl. ......... 726/5; 726/8; 726/9; 726/10; 726/12; 713/158; 713/168
(58) Field of Classification Search ..................... None
See application file for complete search history.

(56) References Cited

U.S. PATENT DOCUMENTS

| 5,586,260 | A   | * | 12/1996 | Hu ................................ 726/12 |
| 6,643,774 | B1  | * | 11/2003 | McGarvey .................... 713/155 |
| 2003/0028773 | A1 | * | 2/2003 | McGarvey et al. ........... 713/176 |
| 2004/0083359 | A1 | * | 4/2004 | Camus et al. ................. 713/156 |

OTHER PUBLICATIONS

"Delegating authentication." Microsoft Technet. Jan. 21, 2005. Microsoft Corporation. <http://technet.microsoft.com/en-us/library/cc739740(printer).aspx>.*
"Easy Setup of Strong Authentication." Isode. Nov 22, 2005. <http://www.isode.com/whitepapers/easy-strong-auth.html>.*
"What Is Impersonation." PluralsightTraining. Nov. 11, 2004. <http://alt.pluralsight.com/wiki/default.aspx/Keith.GuideBook/WhatIsImpersonation.html>.*
"What Is Delegation." PluralsightTraining. Mar. 22, 2005. <http://alt.pluralsight.com/wiki/default.aspx/Keith.GuideBook/WhatIsDelegation.html>.*
M. Blaze, J. Feigenbaum, J. loannidis, and A. Keromytis. The role of trust management in distributed systems security. Secure Internet Programming: Issues in Distributed and Mobile Object Systems, 1603, 1999.*
D. D Clarke, J. Elien, C. Ellison, M. Fredette, A. Morcos, and R. Rivest. Certificate chain discovery in SPKI/SDSI. Journal of Computer Security, 9(4):285-322, 2001.*
V. Ungureanu. Efficient Support for Enterprise Delegation Policies. 2005 ACM Symposium on Applied Computing: 340-346, SAC'05, Mar. 13-17, 2005.*

(Continued)

*Primary Examiner* — Kambiz Zand
*Assistant Examiner* — Imhotep Durham
(74) *Attorney, Agent, or Firm* — Lee & Hayes, PLLC

(57) ABSTRACT

Systems and methods for performing explicit delegation with strong authentication are described herein. Systems can include one or more clients, one or more end servers, and one or more gateways intermediate or between the client and the end server. The client may include an explicit strong delegation component that is adapted to strongly authenticate the client to the gateway. The explicit strong delegation component may also explicitly delegate to the gateway a right to authenticate on behalf of the client, and to define a period of time over which the explicit delegation is valid. The system may be viewed as being self-contained, in the sense that the system need not access third-party certificate or key distribution authorities. Finally, the client controls the gateways or end servers to which the gateway may authenticate on the client's behalf.

18 Claims, 8 Drawing Sheets

OTHER PUBLICATIONS

N. Li, J. Mitchell, and W. Winsborough. Design of a role-based trust-management framework. In Proceedings of the IEEE Symposium in Security and Privacy, pp. 114-130, 2002.*

D. Engert, S. Thompson, and S. Tuecke. Internet X.509 Public Key Infrastructure Impersonation Certificate Profile. IETF—Internet Draft, 2001.*

D. Engert, S. Thompson, and S. Tuecke. Internet X.509 Public Key Infrastructure Restricted Delegation Certificate Profile. IETF—Internet Draft, 2001.*

D. Engert, K. Jackson and S. Tuecke.TLS Delegation Protocol. IETF—Internet Draft, 2001.*

Handbook of Applied Cryptography—Menezes, Oorschot, et al.—1997.*

* cited by examiner

EXPLICIT DELEGATION WITH STRONG AUTHENTICATION

BACKGROUND

In a client-server deployment, clients may be authenticated using physical tokens, such as smart cards, USB authentication tokens or the like. These physical tokens may be used in connection with strong authentication protocols to authenticate clients to one or more servers.

In one deployment model, one or more intermediate gateways may be arranged between the clients and the servers. For a number of reasons, such as load balancing, application sharing, or the like, a given deployment may include a plurality of end servers. If a client wishes to access one of the end servers, for example, the client first authenticates to one of the intermediate gateways. In this manner, the intermediate gateway provides a front-end for one or more back-end servers.

Once the client has authenticated to the intermediate gateway, different scenarios are possible. First, if the deployment model uses trust, the other entities in the model simply trust the intermediate gateway, without re-authenticating the client. Under a trust-based model, once the client has authenticated to the gateway, the client may effectively have access to each entity in the deployment. However, if the gateway is compromised by an intruder, any client who has delegated rights to the gateway may be impersonated by the intruder, and any server using the gateway as a front end may be attacked. Therefore, the trust-based model reduces the security of the overall system, and poses risk to all clients and servers in the system.

One approach to mitigating the risk of a trust-based model is to employ a delegation-based model. In a delegation-based model, after the client authenticates to the intermediate gateway, the client delegates its credentials to the gateway. Having received the client's credentials, the gateway uses these credentials to authenticate on the client's behalf to one or more additional entities, such as gateways or end servers. These other entities then judge the client's credentials for themselves, and determine independently whether to authenticate the client. Put differently, in the delegation model, the gateway is legitimately "impersonating" the client to one or more other entities. In contrast, under the trust model, these other entities simply trust the gateway that first authenticated the client.

It may be desired to combine the security of strong authentication with the benefits of the delegation model. The delegation model entails using credentials that are delegable or reusable. However, strong authentication protocols and related tokens are, by definition, not reusable or delegable to other entities. Therefore, previous approaches have not been able to provide the security of strong authentication with the flexibility of explicit delegation.

SUMMARY

Systems, methods, and/or techniques ("tools") for performing explicit delegation with strong authentication are described herein. The systems can include one or more clients, one or more end servers, and one or more gateways intermediate or between the client and the end server. The client may include an explicit strong delegation component that is adapted to strongly authenticate the client to the gateway. The explicit strong delegation component may also explicitly delegate to the gateway a right to authenticate on behalf of the client, and to define a period of time over which the explicit delegation is valid. The system may be viewed as being self-contained, in the sense that the system need not access a key distribution authority. Finally, the client may control the gateways or end servers to which the gateway may authenticate on the client's behalf.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTIONS OF THE DRAWINGS

Tools for performing explicit delegation with strong authentication are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of many techniques and processes. The following discussion describes exemplary ways in which the tools perform explicit delegation with strong authentication. This discussion also describes other techniques performed by the tools.

Figure 1:
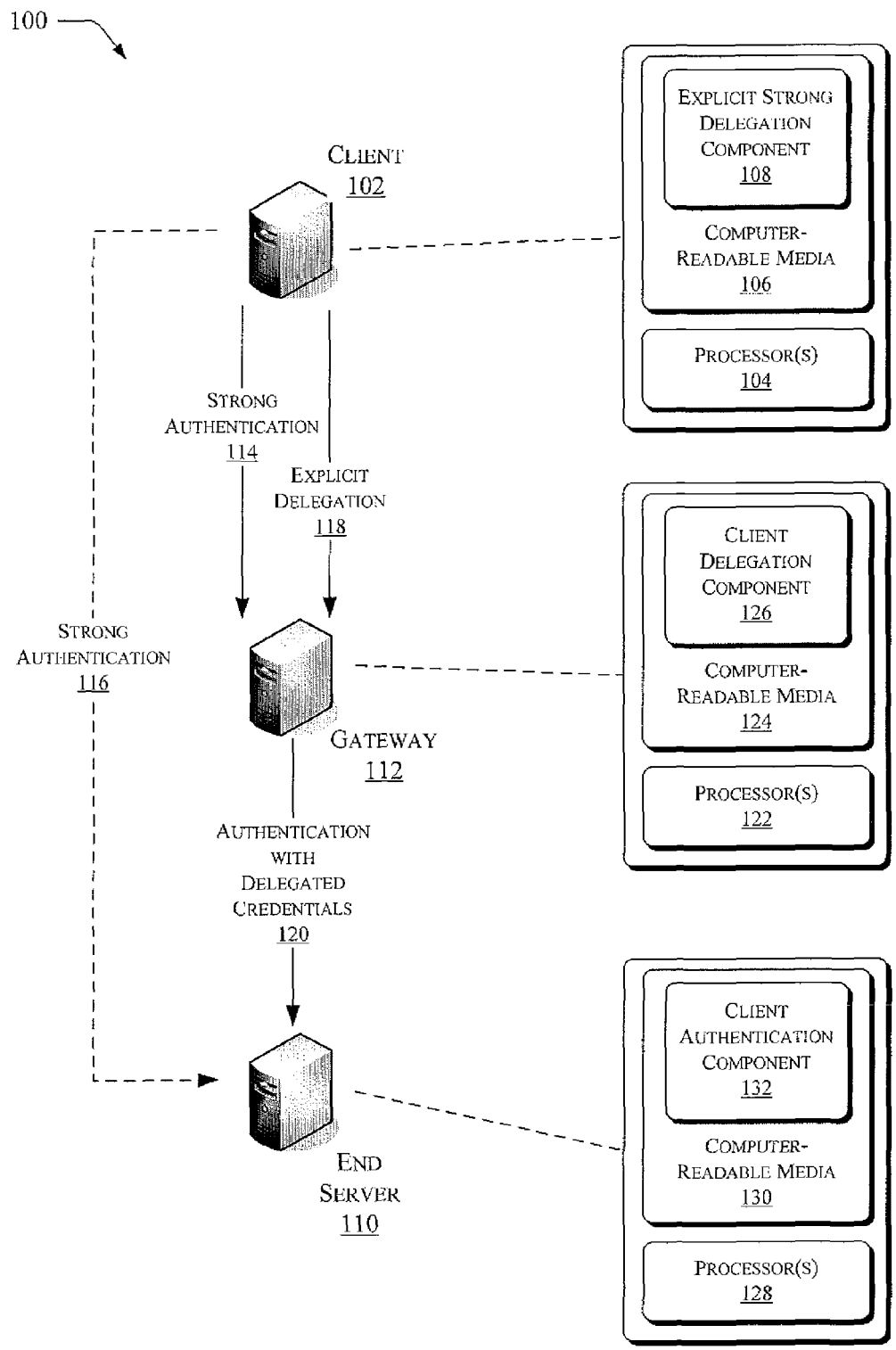
FIG. 1 is a diagram of an operating environment suitable for performing explicit delegation with strong authentication between a client and a gateway.

For convenience only, but not limitation, this document is organized into sections, with the sections introduced by corresponding headings. First, illustrative Operating Environments are described in connection with FIG. 1. FIG. 1 illustrates operating environments related to performing explicit delegation with strong authentication, and also provides illustrative data flows related thereto.

Figure 2:
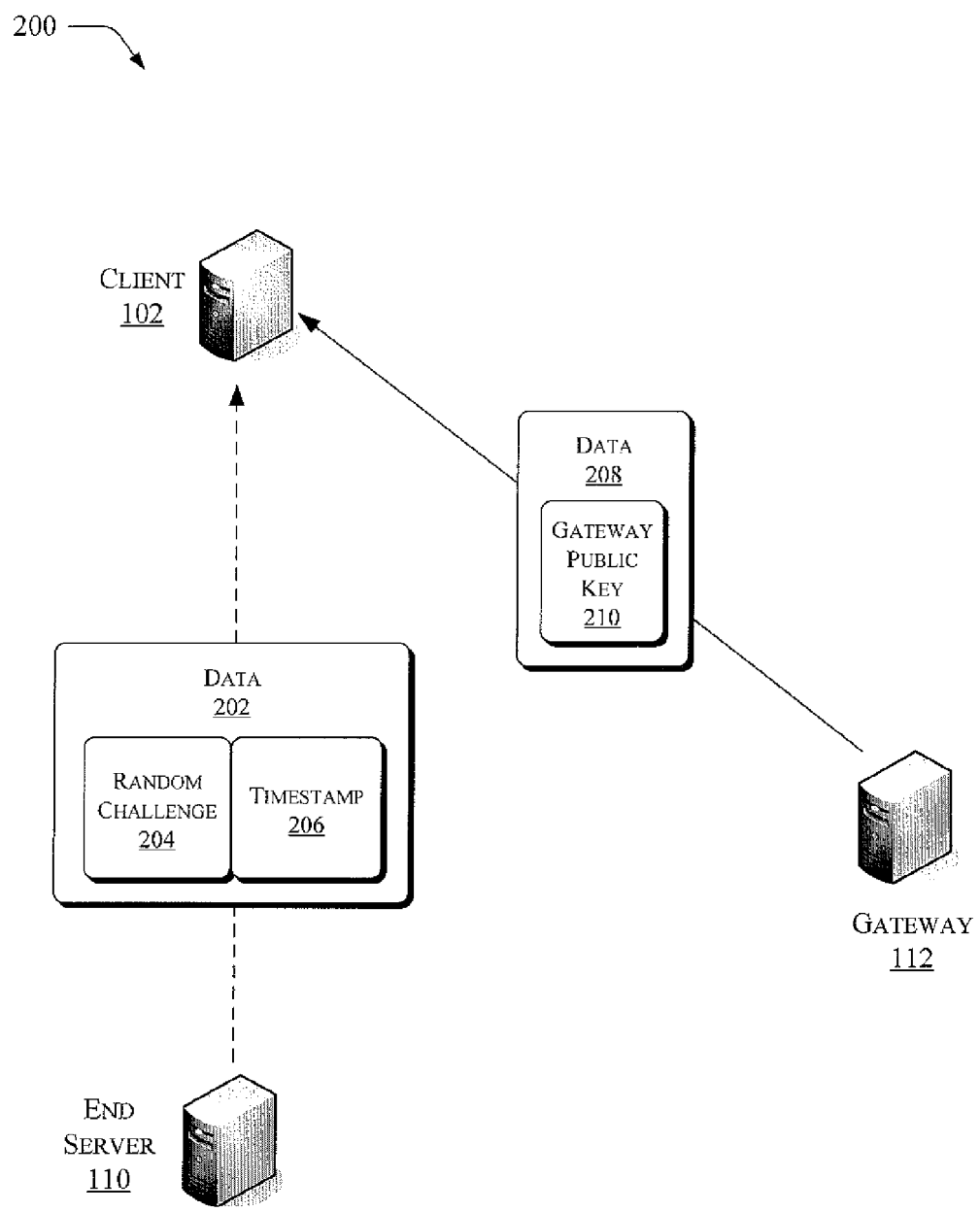
FIG. 2 is a diagram of example data flows to the client that are related to strongly authenticating the client.
Figure 3:
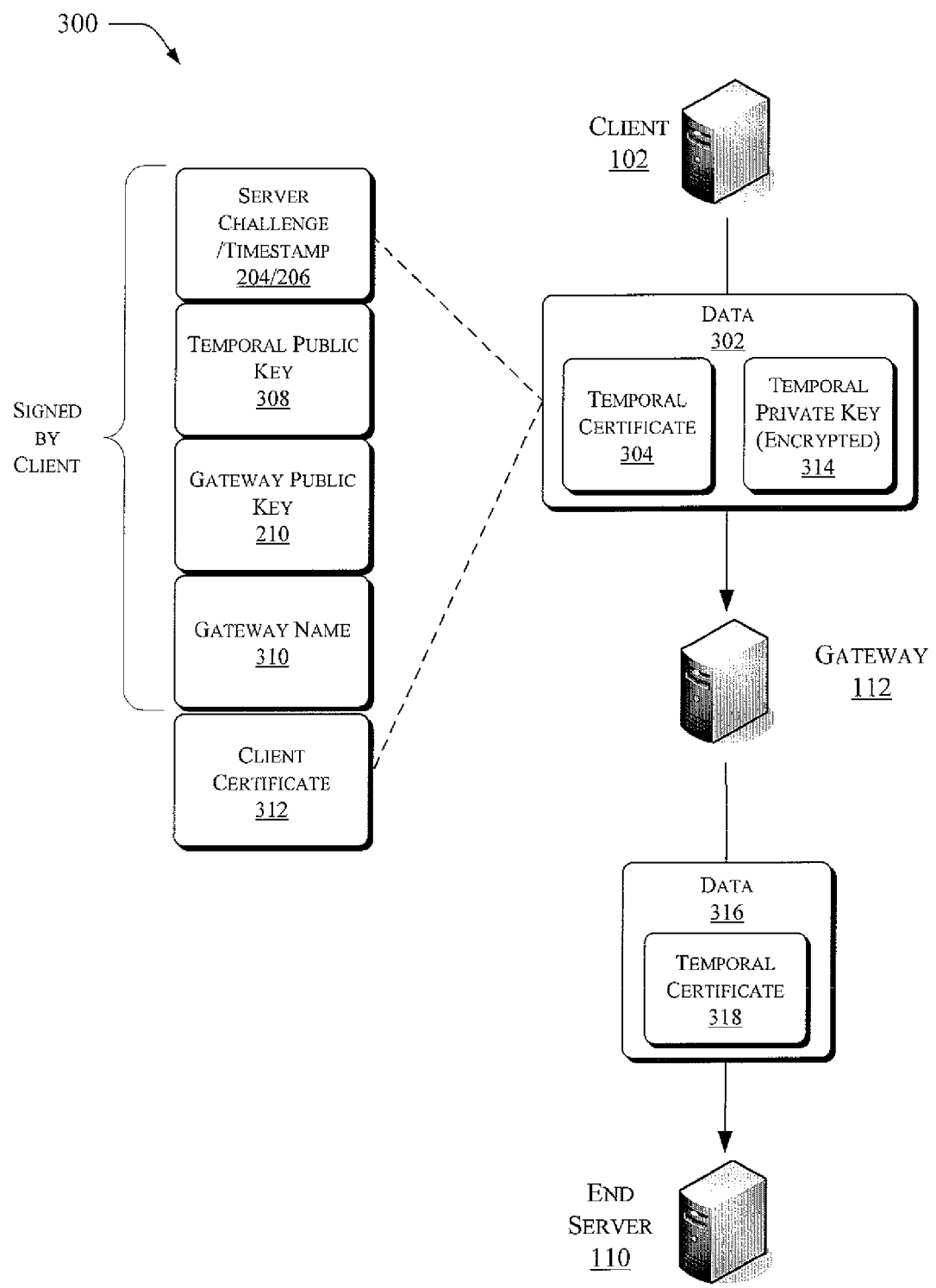
FIG. 3 is a diagram of illustrative data flows from the client that are related to creating a temporal certificate.
Figure 4:
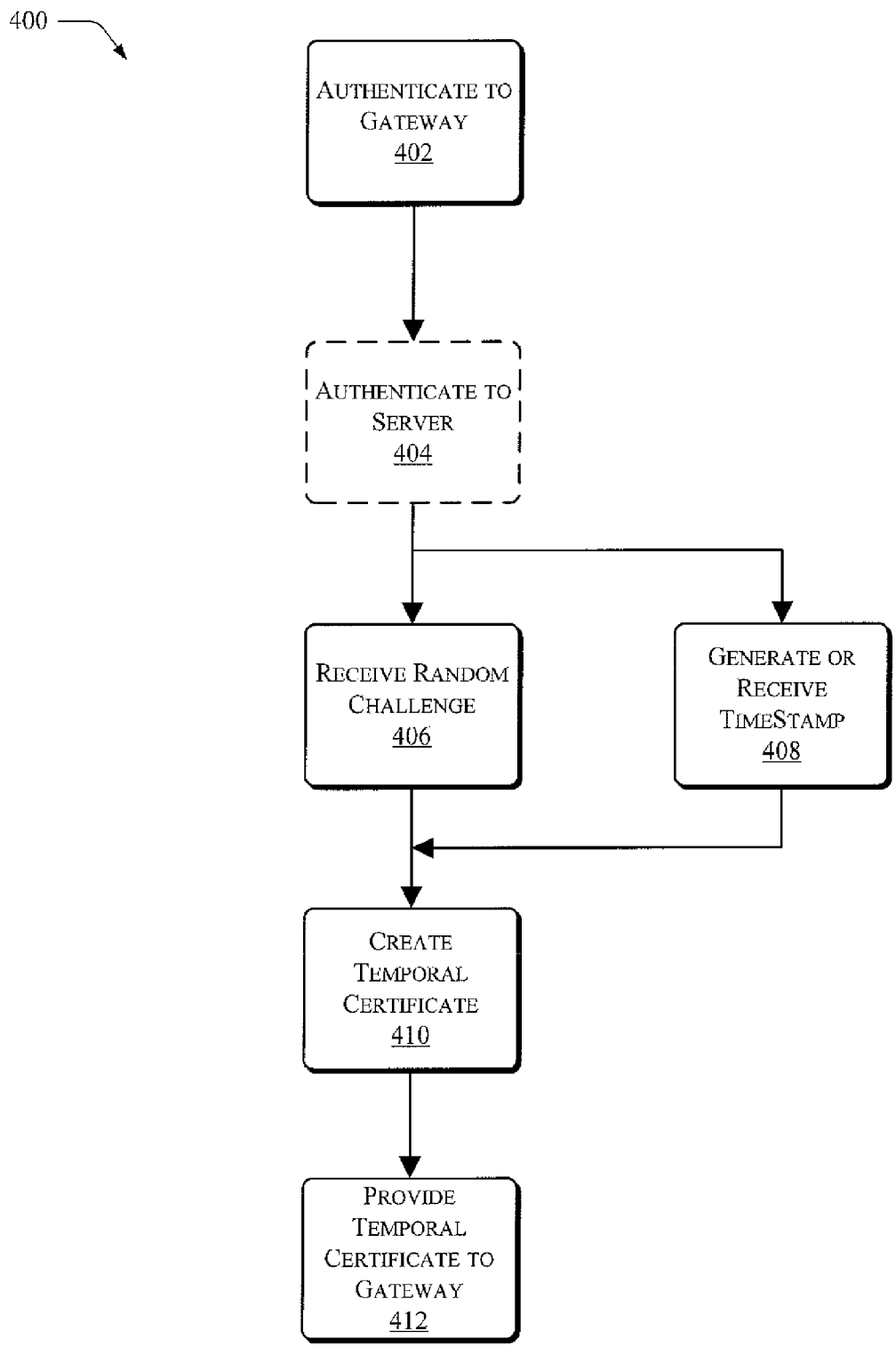
FIG. 4 is a flow diagram of a process by which the client may authenticate at least to the gateway.
Figure 5:
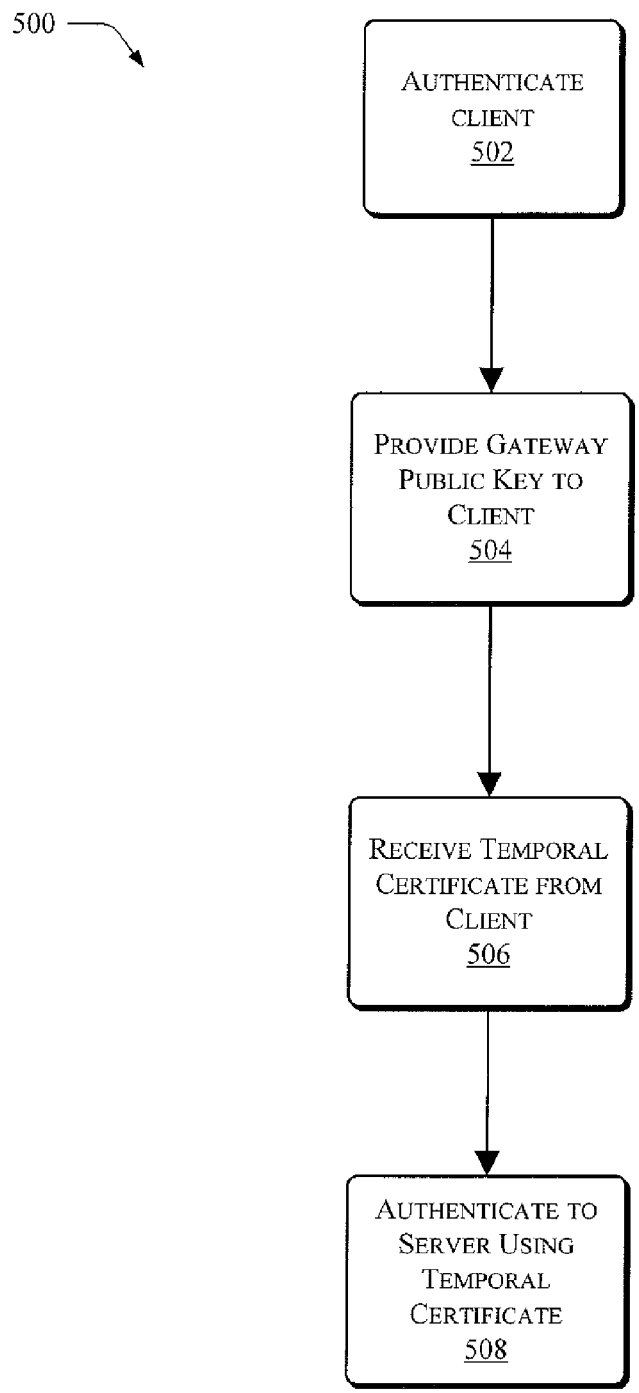
FIG. 5 is a diagram of a process by which the gateway may authenticate to an end server on behalf of the client.
Figure 6:
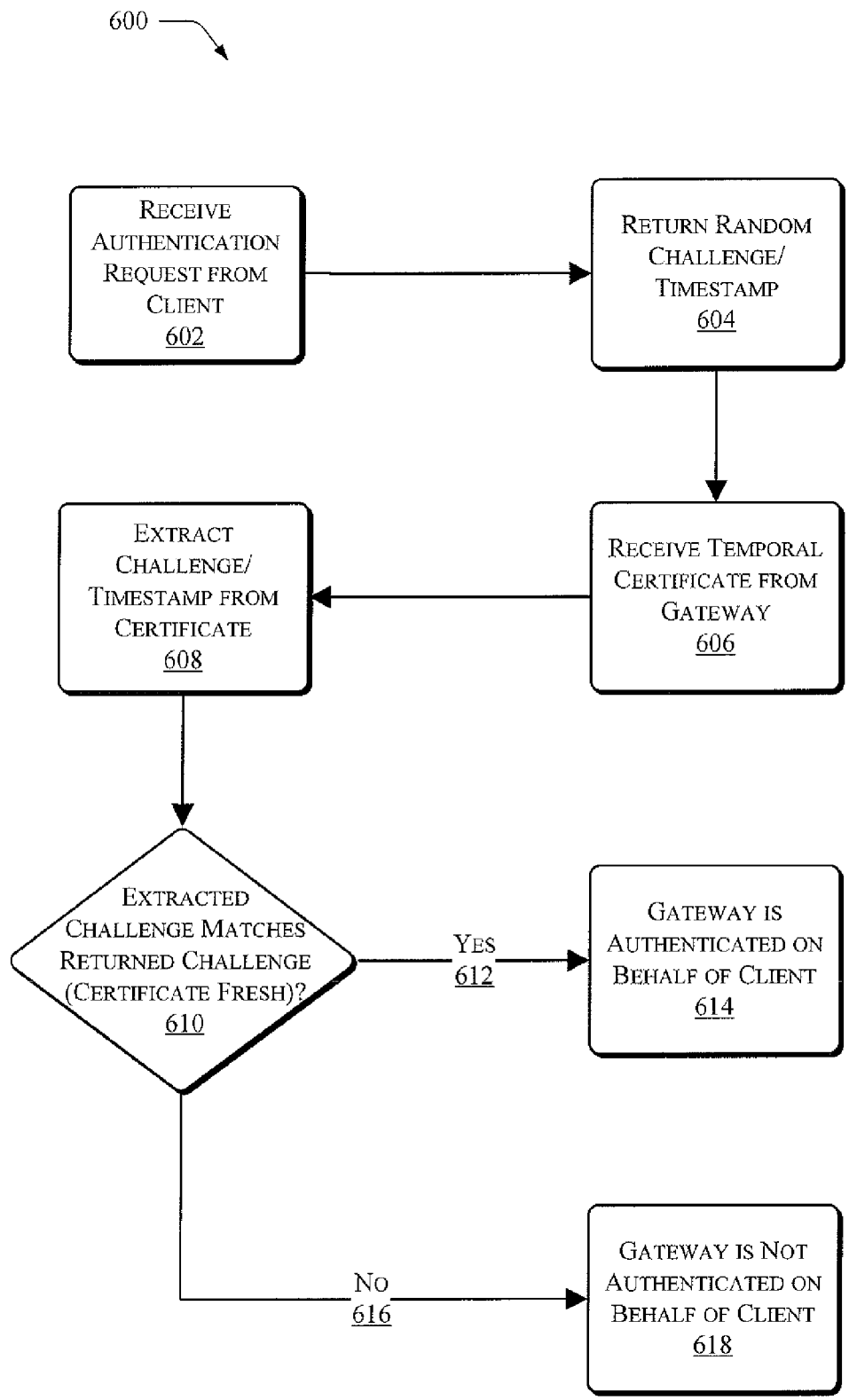
FIG. 6 is a diagram of illustrates a process by which the end server may authenticate the gateway.

Next, Data Flows related to performing explicit strong delegation are described in connection with FIGS. 2-3. FIG. 2 shows data flows to a client and FIG. 3 shows an overall data and process flow for creating a temporal credential that may be delegated by a client to one or more gateways Next, Process Flows for performing various aspects of explicit strong delegation are described in connection with FIGS. 4-6. FIGS. 4-6 illustrate examples of process flows that may be performed by the client, the gateways, and the end servers described herein.

Figure 7:
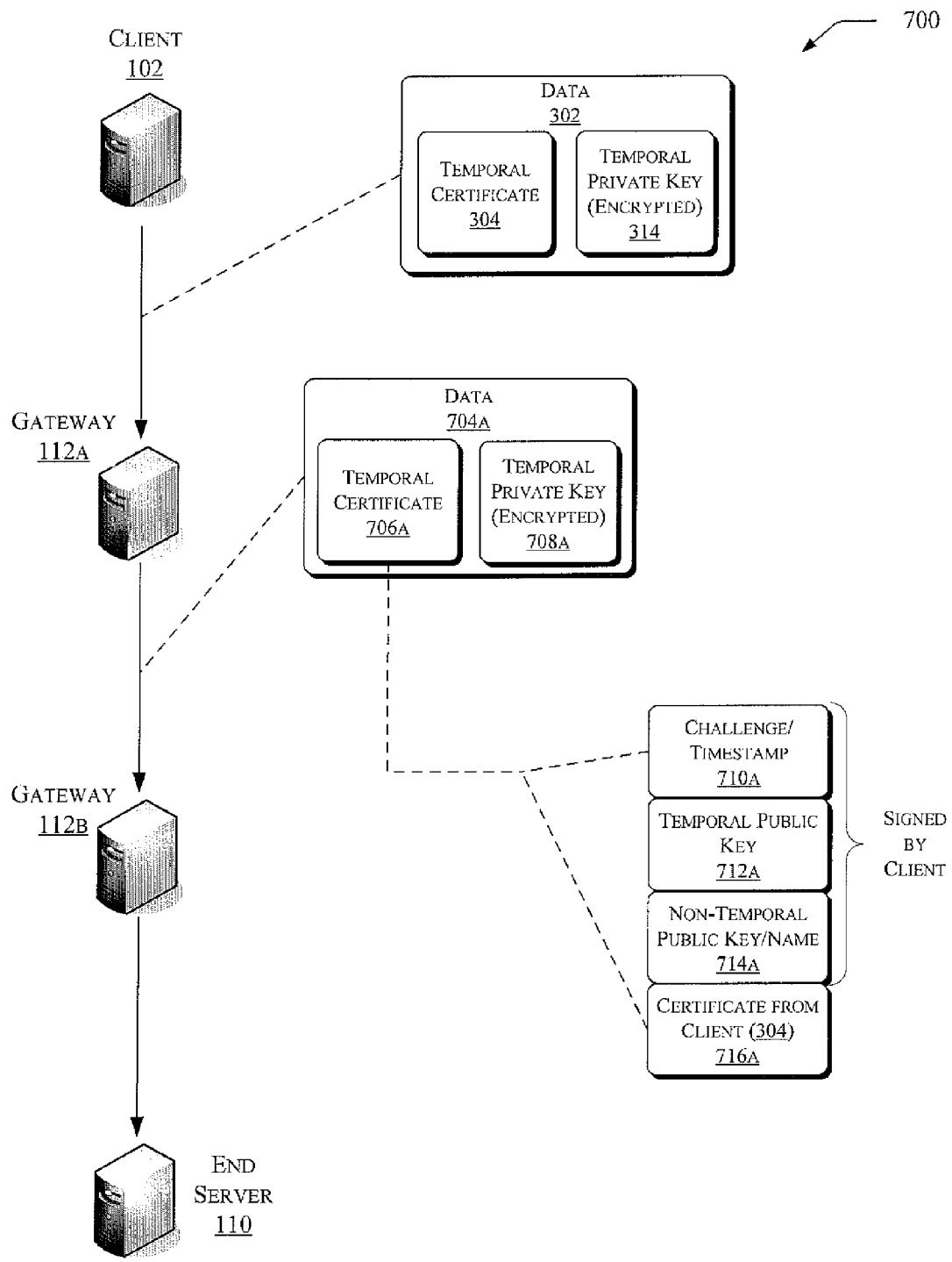
FIG. 7 is a diagram of an example operating environment that includes a plurality of gateways intermediate the client and the end server.
Figure 8:
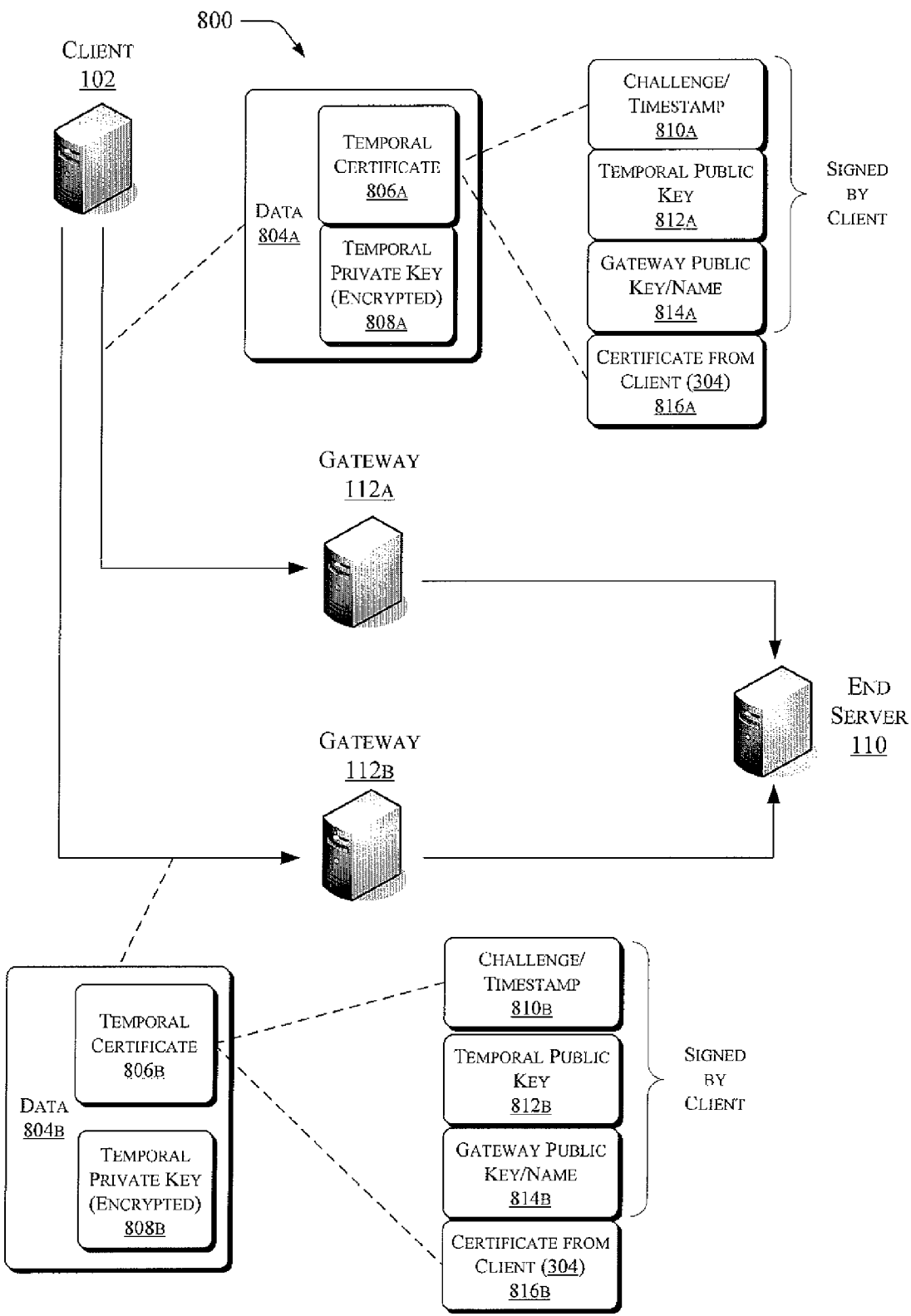
FIG. 8 is a diagram of an example operating environment similar to the operating environment shown in FIG. 9, but adding limited trust.

Finally, Additional Operating Environments are described in connection with FIGS. 7-8. FIG. 7 illustrates a model using multi-level delegation involving multiple intermediate gateways, while FIG. 8 illustrates a single-level delegation model.

Operating Environments

FIG. 1 illustrates an operating environment 100 suitable for performing explicit delegation with strong authentication between a client and a gateway. The operating environment 100 may comprise one or more clients 102. FIG. 1 shows one representative client 102 only for convenience of illustration, but not to limit possible implementations of the operating environment 100. The client 102 may comprise a computing device, such as a network or other server, a desktop computer, a laptop or notebook computer, a mobile telephone, a personal digital assistant (PDA), a handheld computer, or the like.

The client 102 may include one or more processor(s) 104 and computer-readable media 106. The computer-readable media 106 may contain instructions that, when executed by the processor 104, perform any of the tools described herein. The processor 104 may be configured to access and/or execute the instructions embedded or encoded onto the computer-readable media 106. The processor 104 may also be categorized or characterized as having a given architecture.

The computer-readable media 106 may also include an explicit strong delegation component 108. The explicit strong delegation component 108 may process any of the data flows coming into or out of the client 102, and may perform any of the authentication and/or delegation functions or processes described in connection with the client 102. For example, to request access to one or more end servers 110, the client 102 may strongly authenticate to one or more intermediate gateways 112 that are intermediate the client 102 and the end server 110. FIG. 1 shows one representative end server 110 and one representative gateway 112 only for convenience of illustration, but not to limit possible implementations of the operating environment 100. For example, FIGS. 9 and 10 depict multiple gateways 112, and are described below.

The strong authentication of the client 102 to the gateway 112 is represented generally in FIG. 1 by the line 114, and is referenced herein for convenience as strong authentication 114. Without limitation or loss of generality, and only for convenience of understanding, "strong" authentication is understood to refer to authentication protocols that use secret information stored in, for example, physical tokens to produce non-reusable credentials. Examples of physical tokens may include smart cards, USB tokens, or the like.

The strong authentication 114 may be performed, for example, using a protocol such as Transport Layer Security (TLS). The TLS protocol provides communications privacy and security between two applications communicating over a network. The TLS handshake protocol may be used to perform authentication and key exchange as appropriate for establishing or resuming secure sessions. Another example protocol is the Secure Sockets Layer (SSL).

In some implementations, the client 102 may strongly authenticate to the end server 110 after strongly authenticating to the gateway 112. The strong authentication of the client 102 to the end server 110 is represented generally in FIG. 1 by the line 116, and is referenced herein for convenience as strong authentication 116. The strong authentication 116 may be performed using, for example, the TLS handshake protocol over HTTP.

For convenience of illustration only, FIG. 1 shows the line 116 as by-passing the gateway 112. However, it is understood that the strong authentication 116 between the client 102 and the end server 110 may be performed using the gateway 112 as an intermediary, Thus, any messages pertaining to the strong authentication 116 may pass through the gateway 112.

Additionally, the line 116 is shown in dashed outline to indicate that, in some implementations, the client 102 may not authenticate to the end server 110. For example, the client 102 may not have connectivity to the end server 110. In such implementations, the client 102 may create its own timestamp without communicating with the end server 110. This timestamp may be used in later authentications or delegations, as described in more detail below, to establish that the client 102 is active and fresh.

In still other possible implementations, the end server 110 may provide a challenge or timestamp without requiring that the client 102 authenticate to the end server 110.

Whether or not the client 102 strongly authenticates to the end server 110, the client 102 may explicitly delegate its rights to the gateway 112. The explicit delegation of the rights of the client 102 to the gateway 112 is represented generally in FIG. 1 by the line 118, and is referenced herein for convenience as explicit delegation 118. As discussed further below, the explicit delegation 118 can be performed using temporal credentials delegated by the client 102 to the gateway 112.

The gateway 112 then authenticates to the end server 110 using, for example, the delegated temporal credentials. The authentication of the gateway 112 to the end server 110 using the delegated credentials is represented generally in FIG. 1 by the line 120, and is referenced herein for convenience as authentication 120. The authentication 120 establishes to the end server 110 that the gateway 112 acts truly on behalf of the client 102.

Turning to the components of the gateway 112, the gateway 112 can include a processor 122, which may or may not be of the same type as the processor 104. The gateway 112 can also include computer readable media 124, which can contain computer- or machine-executable instructions that, when executed, cause the gateway 112 to perform the various functions described herein. The computer readable media 124 can also include at least a client delegation component 126, which may process any of the data flows coming into or out of the gateway 112, and may perform any of the authentication and/or delegation functions or processes described in connection with the gateway 112.

Turning to the components of the end server 110, the end server 110 can include a processor 128, which may or may not be of the same type as the processors 104 and 122. The end server 110 can also include computer readable media 130, which can contain computer- or machine-executable instructions that, when executed, cause the end server 110 to perform the various functions described herein. The computer readable media 130 can also include at least a client authentication component 132, which may process any of the data flows coming into or out of the end server 110, and may perform any of the authentication functions or processes described in connection with the end server 110.

For convenience only, the lines representing the strong authentications 114 and 116, the explicit delegation 118, and the authentication 120 are shown with one arrowhead only. However, this representation does not limit the data flows possible between the various components of the operating environment 100. Instead, data can flow in any direction within the operating environment 100, consistent with the description herein.

Having described the operating environment 100, the discussion now turns to more detailed descriptions of the strong authentications 114 and 116 and related data flows. These descriptions are presented in connection with FIGS. 2-4.

Data Flows

FIG. 2 illustrates example data flows 200 to the client 102 that are related to strong authentications 114 and 116. Recall that the client 102 authenticates to the gateway 112 and to the end server 110, respectively, using the strong authentications 114 and 116. For convenience of illustration only, FIG. 2 shows certain data flows passing directly from the end server 110 to the client 102. However, it is understood that these data flows would pass through the gateway 112 as an intermediary.

The data flowing from the end server 110 to the client 102 is represented generally in FIG. 2 as data 202. As discussed above in FIG. 1, in some implementations, the client 102 may authenticate to the end server 110. In these implementations, the data 202 represents a data flow related to this authentication. In other implementations, the client 102 does not authenticate to the end server 110. In these implementations, the data 202 may be omitted. Thus, the line representing the data 202 as shown in FIG. 2 is shown in dashed outline.

In but some possible implementations, the data 202 may provide a mechanism for by which the server 110 can determine that the client 102 is alive and active when the gateway 112 attempts to authenticate to the server on behalf of the client 102. In such implementations, the data 202 may include a random challenge 204 from the end server 110. In other implementations, the data 202 may include a timestamp 206 issued by the end server 110. In still other implementations, the client 102 may generate its own timestamp, assuming that the client 102 and the end server 110 each operate from synchronized clocks.

The data flowing from the gateway 112 to the client 102 is represented generally in FIG. 2 as data 208. As part of this data 208, the client 102 may receive a public key 210 from the gateway 112. The client 102 may receive the public key 210 from the gateway 112 as part of a certificate that is provided by the gateway 112 to the client 102 during the SSL/TLS handshake. As discussed in further detail below, the gateway public key 210 may be used to create the delegated credentials by which the gateway 112 authenticates to the end server 110 on behalf of the client 102.

Having described the data flowing to the client 102 in FIG. 2, the discussion now turns to the data flowing from the client 102. This discussion is presented in connection with FIG. 3.

FIG. 3 illustrates illustrative data flows 300 from the client 102 that are related to the explicit delegation 118 and the authentication 120, as shown in FIG. 1. Recall that the explicit delegation 118 is the mechanism by which the client 102 delegates its rights to the gateway 112. Recall also that authentication 120 is the mechanism by which the gateway 112 authenticates to the end server 110 on behalf of the client 102.

The data flow from the client 102 to the gateway 112 is referenced generally in FIG. 3 as data 302. The data 302 can include a temporal certificate 304. Implementations of the temporal certificate 304 may include the random challenge 204 and/or the server-issued timestamp 206, both of which are described above with FIG. 2. The temporal certificate 304 may also include a temporal public key 308.

Additionally, the temporal certificate 304 may include the gateway public key 210 and/or a gateway name 310. The gateway public key 210 was described above with FIG. 2. In implementations using the gateway name 310, the client 102 may already know the name 310 of the gateway 112 because the client 102 used the name 310 to look up an address of the gateway 112. In implementations using the gateway public key 210, the client 102 may obtain the gateway public key 210 from a certificate provided to the client 102 by the gateway 112. Assuming that the certificate from the gateway 112 is signed by a trusted certificate authority, the client 102 may trust this certificate.

In some implementations, using the gateway public key 210 in the temporal certificate 304 may provide a mechanism for containing risk to the client 102 if the private key of the gateway 112 is compromised. In this event, the gateway public key 210 may be revoked, thereby revoking all temporal certificates 304 that were granted to the gateway 112, and also lending a measure of protection to the client 102.

The temporal certificate 304 may also include a client certificate 312. The client certificate 312 may take the form of a relatively permanent (i.e., long-term or non-temporal) client certificate associated with the client 102. The client certificate 312 may be issued to the client 102 by a certificate authority (CA). In the context of this description, the client 102 may be viewed as behaving as a "temporal CA", in that it is issuing the temporal certificate 304 to the gateway 112.

The various components included in an implementation of the temporal certificate 304 can be concatenated and signed using a private key of the client 102. In an illustrative but non-limiting implementation shown in FIG. 3, the challenge 204 and/or the timestamp 206, the temporal public key 308, and the gateway public key 210 and/or the gateway name 310 may be signed by the client 102.

The data 302 sent from the client 102 to the gateway 112 can also include a temporal private key 314. Recall that the temporal certificate 304 may include the corresponding temporal public key 308. The temporal private key 314 may be encrypted using, for example, a public key of the gateway 112. The temporal private key 314 may also be encrypted using other encryption mechanisms established between the client 102 and the gateway 112, so that the temporal private key 314 may be opened only by the gateway 112. An example of such an encryption mechanism is a symmetric key established previously between the client 102 and the gateway 112.

It is understood that the end server 110 may obtain the gateway public key 210. The end server 110 may obtain a certificate from the gateway 112 when the gateway 112 authenticates to the end server 110. The gateway's certificate may include the gateway public key 210 concatenated with the gateway name 212, and signed by a certificate authority.

Having received the data 302 from the client 102, the gateway 112 may then authenticate to the end server 110 on behalf of the client 102. To do so, the gateway 112 may present data 316 to the end server 110. The data 316 may include the temporal certificate as received from the client 102. For convenience of reference only, and not for limitation, the temporal certificate as presented by the gateway 112 to the end server 110 is denoted at 318. However, it is understood that the temporal certificate 304 may be the same as the temporal certificate 318.

As part of the authentication to the end server 110, the gateway 112 may prove to the end server 110 that it possesses the temporal private key 314. This proof may be performed using the SSL/TLS handshake or any other suitable protocol.

Process Flows

Having provided the above descriptions of operative environments and data flows, the discussion now turns to descriptions of illustrative process flows, presented in connection with FIGS. 4-6. For convenience of description only, these process flows are discussed in connection with certain components of the various operating environments shown herein. However, it is understood that the process flows may be implemented with components other than those shown herein without departing from the scope and spirit of this description.

FIG. 4 illustrates a process flow 400 by which the tools enable the client 102 to authenticate itself to the gateway 112 (and, in some implementations, to the end server 110) in connection with creating a temporal certificate, such as the temporal certificate 312. Block 402 authenticates the client 102 to the gateway 112, using, for example, an SSL/TLS handshake. Block 402 may also include obtaining a public key of the gateway 112 (e.g., the gateway public key 210) and/or the name of the gateway 112 (e.g., the gateway name 212).

Block 404 may authenticate the client 102 to the end server 110, using, for example, an SSL/TLS handshake over HTTP. As discussed above, in some implementations, the client 102 may authenticate directly to the end server 110, but not in other implementations. Thus, FIG. 4 shows block 404 in dashed outline.

FIG. 4 illustrates at least two approaches by which the process flow 400 can temporally restrict the certificate 312. In a first approach, block 406 receives a random challenge from the end server 110 (e.g., the random challenge 204). This random challenge 204 may be generated in response to the authentication request represented in block 404. The random challenge 204 may take the form of a random number that is associated with the authentication request from the client 102.

As at least one alternative to the random challenge protocol, block 408 can generate a timestamp representing the time at which the authentication request represented in block 404 occurs. This approach may be suitable when the client 102 and the end server 110 both operate from synchronized clocks or other timing means. Block 408 can also include receiving a timestamp from the end server 110. In any implementation, the blocks 406 and 408 illustrate approaches or techniques by which the end server 110 can determine whether the client 102 is alive and active, and/or whether the certificate 312 presented on behalf of the client 102 is stale.

Block 410 creates a temporal certificate, such as the temporal certificate 312. In different implementations, the temporal certificate 312 can include the random challenge from block 406 or the timestamp from block 408.

Block 412 provides the temporal certificate to the gateway 112. In turn, the gateway 112 uses the temporal certificate to authenticate to the end server 110, as now described in connection with FIG. 5.

FIG. 5 illustrates a process flow 500 by which the tools enable the gateway 112 to authenticate to the end server 110 on behalf of the client 102. Block 502 authenticates the client 102 to the gateway 112. Block 504 provides a gateway public key to the client 102, for use in producing the temporal certificate used by the gateway 112 to authenticate to the end server 110 on behalf of the client 102. The gateway public key may be provided as part of a certificate provided by the gateway to the client 102 during the SSL/TLS handshake between the client and the gateway. The temporal certificate produced by the client 102 may contain the name of the gateway 112 and/or the public key of the gateway 112.

Block 506 receives the temporal certificate delegated by the client 102. Block 508 forwards the temporal certificate to the end server 110 as part of a request to authenticate the gateway 112.

FIG. 6 illustrates a process flow 600 by which the tools enable the end server 110 to authenticate the gateway 112. Put differently, the process flow 600 enables the end server 110 to determine whether the gateway 112 legitimately acts on behalf of the client 102.

Block 602 receives an authentication request from the client 102, for example the authentication request represented in block 402 (FIG. 4). In connection therewith, block 602 authenticates the client 102.

Block 604 returns a random challenge to the client 102. As discussed above, the random challenge is but one mechanism by which the tools enable the end server 110 to determine whether the client 102 that was previously authenticated in block 602 is the same client 102 that delegated its rights to the gateway 112. An example of the random challenge is the random challenge 206. Alternatives to the challenge-based protocol include a timestamp-based mechanism.

Block 606 receives a temporal certificate from the gateway 112. An example of a temporal certificate is the temporal certificate 312.

Block 608 extracts the random challenge or the timestamp from the temporal certificate. Block 610 then evaluates whether the random challenge extracted from the temporal certificate matches the random challenge returned to the client 102 in block 604. Alternatively, in a timestamp-based implementation, block 610 evaluates the timestamp extracted from the temporal certificate is sufficiently recent or fresh as compared to the timestamp issued in block 604. For example, the end server may establish a maximum age allowable for the temporal certificate. In another approach, the temporal certificate itself may specify when it expires. In any event, if the temporal certificate is sufficiently recent or fresh, the process flow 600 takes Yes branch 612 to block 614. Block 614 authenticates the gateway 112 as a delegatee of the client 102.

Returning to block 610, if the random challenge extracted from the temporal certificate does not match the random challenge returned to the client 102 in block 604, then process flow 600 takes No branch 616 to block 618. In implementations based on random challenges, the end server 110 may store a history of the random challenges it has sent out to clients 102 to enable this comparison.

In implementations based on timestamps, if the temporal certificate is not sufficiently recent or fresh, then the process flow 600 may also take No branch 616 from block 610 to block 618. In any event, block 618 rejects the authentication request of the gateway 112.

Several observations are now noted regarding the operating environment 100 and related tools. First, the client 102 may perform explicit strong delegation using, for example, the entities and/or components shown in FIG. 1. However, the operating environment 100 need not refer to third-party entities, such as certificate authorities (CAs), key distribution centers (KDCs), or the like. Further, the client 102, the gateway 112, and/or the end server 110 need not have any direct or indirect connectivity with such third parties. In this sense, the operating environment 100 may be viewed as being self-contained. On at least this basis, the tools described herein are distinguished from authentication protocols such as Kerberos.

Second, using mechanisms such as the temporal certificate 312, the client 102 can control the period of time over which any delegates (such as the gateways 112) may authenticate on behalf of the client. More particularly, the random challenge and/or timestamp approaches, as incorporated into the temporal certificate 312, may implement this time period. Additionally, the temporal certificate may be defined to have an expiration time.

Having provided the above description of various tools for performing explicit strong delegation, the discussion now turns to a description of additional operating environments and related tools for explicit strong delegation. This description is presented in connection with FIGS. 7 and 8.

Additional Operating Environments

FIG. 7 illustrates an example operating environment 700 that includes a plurality of gateways 112 intermediate the client 102 and the end server 110. For example only, FIG. 7 shows two gateways 112a and 112b, although it is understood that the operating environment 900 can include any number of gateways 112. In general, the operating environment 700 can include "n" gateways 112, where n is any positive integer. The operating environment 100 shown in FIG. 1 may be considered a case where n=1, while the operating environment 700 shown in FIG. 7 may be considered a case where n=2. An illustrative sequence of data flows is now described.

The client 102 and the gateways 112 generate their own temporal certificates and corresponding temporal private and public keys. Additionally, the gateways 112 obtain respective instances of the challenges/timestamps from the end server 110. The challenge/timestamp obtained by the gateway 112a is denoted at 702a, and the challenge/timestamp obtained by the gateway 112b is denoted at 702b.

The client 102 provides a data flow to the first gateway 112a. This data flow was described above with FIG. 3, and for convenience, the data flow 302 is carried forward from FIG. 3. The data flow 302 may include the temporal certificate 304 and the encrypted temporal private key 314. All of the description of these elements provided above in FIG. 3 applies to these elements as shown in FIG. 7.

The data flow 704a from the first gateway 112a to the second gateway 112b includes a temporal certificate 706a and a temporal private key 708a generated by the gateway 112a. These data represented in blocks 706a and 708a are now described in more detail.

The temporal certificate 706a includes a challenge/timestamp 710a obtained by the gateway 112a from the end server 110. The temporal certificate 706a also includes a temporal public key 712a generated by the gateway 112a, as well as a non-temporal public key 714a associated with the gateway 112a. It is understood that the block 714a may also represent a name associated with the gateway 112b. Finally, the temporal certificate 706a may include the temporal certificate 304 received from the client 102. The temporal certificate 304 as incorporated into the temporal certificate 706a is denoted at 716a.

The data represented in blocks 710a, 712a, and 714a may be concatenated, and signed using a temporal private key generated by the first gateway 112a.

The temporal private key 708a included in the data 704a may be encrypted with the permanent public key of the second gateway 112b. The data 704a is now sent to the second gateway 112b. In this manner, the first gateway 112a authenticates to the second gateway 112b on behalf of the client 102. In addition, the gateway 112a may prove to the second gateway 112b that it possesses the temporal private key 314. This proof may occur as part of the SSL/TLS handshake or any other protocol.

The second gateway 112b receives the data 704a, extracts the temporal certificate 706a therefrom, and passes the temporal certificate 706a to the end server 110. In this manner, the gateway 112b authenticates to the end server 110 on behalf of the first gateway 112a, and ultimately on behalf of the client 102. In addition, the last gateway (e.g., 112b) may prove to the end server 110 that it possesses the temporal private key 708a. This proof may occur as part of the SSL/TLS handshake or any other protocol.

In other implementations of the operating environments 100 or 700, the temporal certificate can include a list of allowed end-servers 110. In such implementations, the temporal certificates may indicate the target services for which the temporal credentials are valid. In other words, an entity may restrict the gateways 112 and/or end servers 110 that may trust the delegation as expressed in the temporal certificate. For example, the temporal certificate 304 may include a list of public keys and/or names of allowed/non-allowed gateways 112 and/or end-servers 110. Any gateway 112 and/or end-server 110 that receives an authentication request may check that it is in the allowed list and not in the non-allowed list of any certificate in the certificate chain that is used for that authentication request.

In addition to the allowed/non-allowed list in the temporal certificate, an entity may specify the purpose for which this chain of trust may be used. This can include specific resources (e.g., "this authentication chain is valid for accessing this specific file or Web site") or more general "types" of access (e.g., Web-based access, file system access). These purposes may be specified via one or more attributes included in the temporal certificate.

The operating environment 700 may be characterized as a "multi-level delegation" environment that includes a chain of entities. Each entity delegates rights or credentials to the next entity in the chain, effectively creating a chain of trust. For example, the client 102 trusts the first gateway 112a to authenticate on its behalf, the first gateway 112a trusts the second gateway 112b to authenticate on its behalf, etc. It is noted that each entity may serve as a "temporal certificate authority" for the next entity in the chain. The recursive definition of the temporal certificate generates a certificate chain.

More formally, the data(n) passing from a gateway(n) to a gateway(n+1) may be defined as follows:

Data(0)—The data that the client sends to the first gateway
Data(1)—The data that the first gateway sends to the second gateway
Data(n)—The data that the $n^{th}$ gateway sends to the $(n+1)^{th}$ gateway
Name(n)—The name of entity n
PermanentPrivateKey(n)—The "permanent" (non-temporal) private key of entity n (n = 0 is the client, n = 1 is the first gateway)
PermanentPublicKey(n)—The "permanent" (non-temporal) public key of entity n (the "counterpart" of PermanentPrivateKey(n))
PermanentCertificate(n)—The "permanent" (non-temporal) certificate of entity n (this contains PermanentPublicKey(n)
TemporalPrivateKey(n)—The temporal private key of entity n, issued by entity n−1, the "temporal certificate authority"
TemporalPublicKey(n)—The temporal public key of entity n, issued by entity n−1, the "temporal certificate authority"
TemporalCertificate(0) = PermanentCertificate(0)
TemporalPrivateKey(0) = PermanentPrivateKey(0)
Timestamp(n) = The timestamp of the creation of TemporalCertificate(n), as entered by entity n−1
Data(n) = TemporalCertificate(n+1) ∥
$e_{PermanentPublicKey(n+1)}$(TemporalPrivateKey(n+1))
Where:
TemporalCertificate(n+1) =
$s_{TemporalPrivateKey(n)}$(Challenge(n+1)/Timestamp(n+1) ∥
TemporalPublicKey(n+1) ∥ PermanentPublicKey(n+1)/Name(n+1)) ∥
TemporalCertificate(n)

Having described the operating environment 700, several observations are now noted. As noted above, the operating environment 700 provides a multi-level delegation model that introduces some level of trust. This model may reduce the overall security of the operating environment 700 to some extent. However, the operating environment 700 may offer improved efficiency as compared to the other operating environments described herein. For example, in the operating environment 700, the client 102 communicates only with the first gateway 112a. In turn, the first gateway 112a communicates with and delegates to one or more other gateways 112. Thus, the client 102 does not communicate directly with these other intermediate gateways 112, or with the end server 110. In this manner, the client 102 is relieved of the overhead involved in these communications, and this overhead is transferred to the other intermediate gateways 112.

In other instances, the client 102 may not have connectivity or visibility to at least some of the gateways 112 (e.g., gateways 112b or 112c), and/or the end server 110. However, if the client 102 has connectivity or visibility to at least one of the gateways (e.g., gateway 112a), then the operating environment 700 can enable the client 102 to delegate to this one gateway (e.g., gateway 112a). In turn, the gateway to which the client 102 delegates may have connectivity or visibility to other gateways 112 and/or the end server 110. In this manner, the operating environment 700 may enable the client 102 to conduct operations involving the gateways 112 or the end server 110, which operations may not be otherwise possible due to lack of connectivity or visibility from the client 102.

Thus, it is understood that the operating environment 700 offers increased flexibility and efficiency to the client 102, as a trade-off against the reduced security and increased risk related to introducing limited trust.

Having described a multi-level delegation environment in FIG. 7, the description now turns to a "single level" delegation environment, presented in FIG. 8.

FIG. 8 illustrates another example operating environment 800 that includes a plurality of gateways 112 intermediate the client 102 and the end server 110 according to a single level delegation model. For example only, FIG. 8 shows two gateways 112a and 112b, although it is understood that the operating environment 800 can include any number of gateways 112. In general, the operating environment 800 can include "n" gateways 112, with "n" being any positive integer.

In the "single-level delegation" model, a gateway 112 may authenticate on behalf of a client 102 that explicitly delegated this right to the gateway 112. Instead of creating a chain of trust, as in FIG. 7 above, the client 102 authenticates first to the first gateway 112a. The gateway 112a then authenticates to the end server 110, on behalf of the client 102. The client 102 then authenticates to the second gateway 112b. The gateway 112b then authenticates to the end-server 110 on behalf of the client 102.

An illustrative formal definition of the single-level delegation model shown in FIG. 8 is given by the following:

---

Data(1)—The data that the client sends to the first gateway
Data(2)—The data that the client sends to the second gateway
Data(n)—The data that the client sends to the $n^{th}$ gateway
GatewayPublicKey(n)—The public key of the $n^{th}$ gateway
GatewayName(n)—The name of the $n^{th}$ gateway
Data(n) = TemporalCertificate(n) ∥ $e_{GatewayPublicKey(n)}$(TemporalPrivateKey(n))
Where:
TemporalCertificate(n) = $s_{ClientPrivateKey}$(Challenge(n)/Timestamp(n) ∥ TemporalPublicKey(n) ∥ GatewayPublicKey(n)/GatewayName(n)) ∥ ClientCertificate

---

Turning to the operating environment 800 in more detail, the client provides a data flow 804a to the first gateway 112a to explicitly delegate its rights thereto. The data 804a may include a temporal certificate 806a created by the client 102, and a private key 808a encrypted by the client 102. The data represented by blocks 806a and 808a are now described in more detail The temporal certificate 806a may include a challenge/timestamp 810a, a temporal public key 812a generated by the client 102. The temporal certificate 806a may also include a public key and/or name associated with the gateway 112a, both of which are denoted at 814a. The temporal certificate 806a may also include a client certificate 816a, an example of which is given in FIG. 3 at 304.

The data included in the temporal certificate 806a (represented by, e.g., blocks 810a, 812a, and 814a) may be concatenated and signed using a private key associated with the client 102.

Turning to the temporal private key 808a, it may be encrypted by the client 102 using a public key associated with the gateway 112a.

The client 102 can explicitly delegate its rights to the gateway 112a by providing the data 804a to the gateway 112a. Having received the data 804a, the gateway 112a can strongly authenticate to the end server 110 on behalf of the client 102.

In implementations where the temporal certificate does not contain the name or public key of a given gateway (e.g., gateway 112a), the client 102 may provide the same temporal certificate 806a to other gateways, such as the gateway 112b. In other implementations, the temporal certificate is gateway-specific, and the client 102 may create a different temporal certificate 806 for each particular gateway. For convenience of reference only, FIG. 8 illustrates data 804b, which may include temporal certificate 806b and private key 808b. The private key 808b may be encrypted using the public key of the gateway 112b. As noted above, the temporal certificate 806b may be the same as the temporal certificate 806a described above. Alternatively, the client 102 may create a different temporal certificate 806b for explicitly delegating to the gateway 112b.

It is also noted that the challenge/timestamp 810 in the temporal certificates 806 may be the same for all gateways 112 to which the client 102 explicitly delegates in the single level delegation model shown in FIG. 8.

CONCLUSION

Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain flow diagrams described and illustrated herein, it is noted that the processes and sub-processes depicted therein may be performed in orders other than those illustrated without departing from the spirit and scope of the description herein.

The invention claimed is:

1. A system comprising:
   a client;
   the client including an explicit strong delegation component that is adapted to:
   provide a temporal certificate and an encrypted temporal private key to a first gateway, the temporal certificate includes a random challenge and a server-issued timestamp and the encrypted temporal private key is encrypted based on at least a public key of the first gateway;
   strongly authenticate the client to the first gateway by using Transport Layer Security (TLS) as an authentication protocol with the temporal certificate and the encrypted temporal private key stored in USB tokens to produce non-reusable credentials, wherein the temporal certificate includes a temporal public key and the public key of the first gateway, the public key is a non-temporal public key;

explicitly delegate to a second gateway a right to authenticate on behalf of the client using the temporal certificate delegated by the client;

define a period of time over which the explicit strong delegation is valid;

the client is configured to rely on the temporal certificate to provide a mechanism for containing risk to the client, when a private key of the first gateway is compromised, the first gateway public key is revoked, and the temporal certificate that was granted to the first gateway is revoked;

the client is configured to rely on the temporal certificate to provide the mechanism for containing risk to the client, wherein:

when the private key of the first gateway is not compromised, the first gateway authenticates to the second gateway; and the second gateway authenticates to an end server based on the end server returning acknowledgement of the random challenge and the server-issued timestamp.

2. The system of claim 1, wherein the client and the first and the second gateways have no online connectivity with a third-party authority.

3. The system of claim 1, wherein the client is adapted to limit the delegation so that the second gateway may authenticate on behalf of the client only to a specified entity.

4. The system of claim 1, wherein the second gateway is adapted to authenticate to the end server based on the explicit delegation from the client.

5. The system of claim 1, wherein the client is adapted to create the temporal credential, and to delegate the temporal credential to the second gateway.

6. The system of claim 5, wherein the temporal credential includes one of a random challenge returned by the end server and a timestamp.

7. The system of claim 5, wherein the temporal credential includes a temporal key pair, and wherein the temporal key pair is created by one of the client and the first gateway.

8. The system of claim 5, wherein the temporal credential includes a name of first gateway.

9. A method executable, at least in part, on a computer-based device, the method comprising:

strongly authenticating to at least one gateway that is intermediate at least one client and at least one end server, wherein the authenticating uses Transport Layer Security (TLS) as an authentication protocol including a temporal certificate and an encrypted temporal private key stored in USB tokens to produce non-reusable credentials, the temporal certificate includes a random challenge and a server-issued timestamp the temporal certificate further includes a temporal public key and a gateway public key, the gateway public key is a non-temporal public key;

providing a mechanism for containing a risk to the client, when a private key of the at least one gateway is compromised, by revoking the gateway public key, then revoking the temporal certificate that was granted to the at least one gateway; and when the private key of the at least one gateway is not compromised, explicitly delegating to the at least one gateway a right to authenticate on behalf of the client based on at least the temporal certificate delegated by the client and the at least one gateway authenticating to the end server based on the end server returning acknowledgement of the random challenge and the server-issued timestamp;

wherein the client and the at least one gateway have no online connectivity with a third-party authority.

10. The method of claim 9, further comprising defining a period of time over which the explicit delegation is valid.

11. The method of claim 9, further comprising creating the temporal credential that includes a temporal key pair, and further comprising delegating the temporal credential to the gateway.

12. The method of claim 9, further comprising limiting the delegation so that the gateway may authenticate on behalf of the client only to a specified entity.

13. A method executable, at least in part, on a computer-based device, the method comprising:

strongly authenticating to at least one gateway that is intermediate at least one client and at least one end server, wherein the authenticating uses Transport Layer Security (TLS) as an authentication protocol including a temporal certificate that includes a random challenge and a server-issued timestamp and an encrypted temporal private key that is encrypted based on at least a public key of the gateway, stored in USB tokens to produce non-reusable credentials, wherein the temporal certificate includes a temporal public key and a public key of a gateway, the public key is a non-temporal public key;

providing a mechanism for containing a risk to the client when a private key of the gateway is compromised, by revoking the gateway public key, and then revoking the temporal certificate granted to the gateway;

defining a period of time over which the explicit delegation is valid;

when the private key of the gateway is not compromised, explicitly delegating at least to the gateway a right to authenticate on behalf of the client;

authenticating by the gateway to the at least one end server based on the at least one end server returning acknowledgement of the random challenge and the server-issued timestamp; and limiting the delegation so that the gateway may authenticate on behalf of the client only to a specified entity.

14. The method of claim 13, wherein the client and the gateway have no direct or indirect connectivity with a third-party authority.

15. The method of claim 13, further comprising strongly authenticating to at least a second gateway that is intermediate the client and the end server, and further comprising explicitly delegating to the gateway a right to authenticate on behalf of the client to the second gateway; and further comprising explicitly delegating to the second gateway a right to authenticate on behalf of the client to the end server.

16. The method of claim 13, further comprising limiting the delegation so that the gateway may authenticate on behalf of the client only to a plurality of specified entities.

17. The method of claim 13, further comprising creating the temporal credential that includes a temporal key pair, and further comprising delegating the temporal credential to the gateway.

18. The method of claim 13, further comprising receiving a random challenge from the end server, and further comprising incorporating the random challenge into a temporal credential.

* * * * *